Patented May 19, 1936

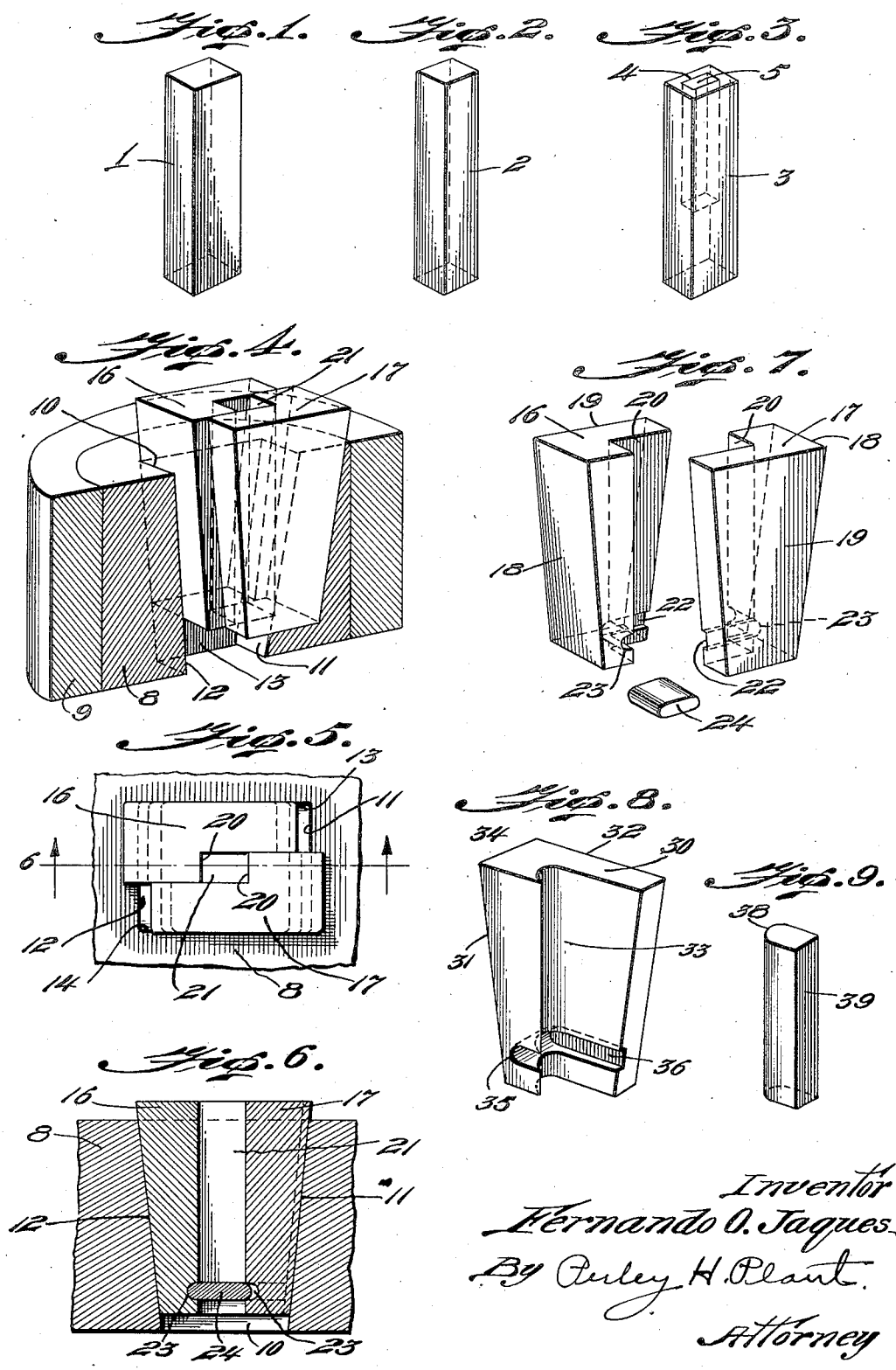

2,041,347

UNITED STATES PATENT OFFICE 2,041,347

CUTTING TOOL AND METHOD OF MAKING THE SAME

Fernando Oscar Jaques, Providence, R. I., assignor of one-half to Louis S. Moulthrop, Cranston, R. I.

Application February 23, 1933, Serial No. 658,089

8 Claims. (Cl. 76—101)

This invention relates to an improved method for treating metals to form metal cutting or metal working tools possessing a high degree of hardness and toughness and capable of maintaining such qualities at high temperatures, as well as novel devices of this character possessing a fine and uniform grain texture throughout and which are adapted to receive and retain a fine and uniform cutting edge.

Heretofore, machine tools, such as lathe bits, planer tools, turning tools and the like have been made from high speed steels, and numerous hard metal alloys, such for example as, the class of alloys containing nickel or cobalt and one or more metals of the chromium group, one of the principal alloys of this type being generally known under the name of "stellite". Cutting tools made from any of the above described materials possess to a high degree the properties of hardness, resistance to wear and ability to retain a cutting edge under difficult working conditions.

I have discovered that these properties of metal cutting or metal working tools may be greatly increased over those heretofore possessed by such tools when suitable metals are subjected to the special treatment hereinafter described.

One object of the invention is the provision of a method of treating the metals which is designed and adapted to compact the metal particles throughout, impart a fine and uniform texture to the metal and at the same time greatly increase its hardness and toughness whereby it is capable of receiving a fine and uniform cutting edge and is especially adapted for the high speed cutting of metals.

Another object of the invention is the provision of a method of the character described which renders metals thus treated highly tenacious, thereby reducing their tendency to break under torsion or strain, while at the same time imparting extreme hardness to the metals.

Another object of the invention is the provision of an improved metal cutting or metal working tool possessing to a high degree the qualities of hardness and toughness required for high speed work as well as having a grain texture which will insure the formation of fine and uniform work.

Other objects and advantages of the invention relate to various steps and arrangements of steps for carrying out the method and in various improved details of parts and arrangements of means employed as will be more fully set forth in the detailed description to follow.

Referring to the drawing:—

Fig. 1 is a perspective view of a metal shape such as may be employed for forming a tool bit prior to its treatment by the improved method, Fig. 2 is a perspective view of the metal shape shown in Fig. 1, after it has been subjected to treatment in accordance with the improved method, Fig. 3 is a slightly enlarged perspective view of a modified form of tool bit such as is adapted to be treated by the improved method in forming a cutting tool bit, Fig. 4 is a perspective view, partially in section, of die members such as may be employed in carrying out the method together with one form of die holder, Fig. 5 is a top plan view of the die members and holder shown in Fig. 4, Fig. 6 is a vertical sectional view through the die members and holder, taken substantially along the lines 6—6 of Fig. 5, Fig. 7 is a perspective view of the die members and supporting plate in separated relation, Fig. 8 is a perspective view of a modified form of die member, such as may be employed in forming tool bits or cutters of special shape adapted for a particular use, and, Fig. 9 is a perspective view of one form of tool bit such as may be shaped by means of a special die member as shown in Fig. 8.

In Figs. 1 and 2 of the drawing I have shown a metal shape 1, which may be made from any suitable steel or iron, such as a steel alloy, high speed steel, high speed alloy, or any other suitable metal or alloy, illustrating roughly its appearance prior to being treated in accordance with the present method, while 2 designates the appearance of the shape 1 after treatment, with its cross-sectional area diminished by compression.

In Fig. 3 of the drawing there is shown a metal shape 3, which may be made from any suitable steel or iron adapted for the purpose, and which as shown is provided with an opening 4 extending partially or entirely therethrough, and within which may be cast or inserted a high speed steel or alloy block 5, such for example as, stellite or the like, to illustrate the general form and appearance of a composite metal shape which may be treated by my improved method to make a metal cutting or metal working tool.

While reference is made in the specification to metal alloy or alloys generally known as stellite, such alloys, although varying somewhat in composition, may be said to be made up principally of cobalt and one or more metals of the chromium group.

In this connection it may be stated that it has been proposed heretofore to cast a stellite core within an iron or steel shape of the same general character as indicated at 3, the purpose being to provide a supporting shell for the stellite in order to protect it from fracture. Such is not the purpose in the present case, since the method herein described increases the toughness of the stellite to such an extent as to render it fracturable only with difficulty.

The present method of treating metals such as high speed steel, certain steel alloys, high speed alloys and hard metals generally which are capable of being raised to high temperatures without injury to the metal to increase their toughness and hardness as well as to improve their cutting qualities comprises, heating the metal shape out of direct contact with a flame to a high temperature closely approaching the fusion point of the metal, as in the case of alloy steels having melting points approximating 2700 degrees F. and stellite melting at approximately 2300 degrees F., I prefer to heat to such a temperature as will render the metals slightly plastic or partially plastic under pressure, as may generally be accomplished at temperatures of 1800 to 2100 degrees F. The heated metal shape is then immediately subjected to a high pressure, of from 3000 to 10,000 pounds per square inch, (as by a sudden blow) which pressure in cases of shapes having the form shown in Figs. 1 to 3, is preferably applied laterally of the shape or at substantially right angles to the major axis thereof.

In Figs. 4 to 7 inclusive there is shown one form of means adapted for the purpose of compressing the metal of the shape after heating as above described. The pressure mechanism comprises a holder member 8 having a supporting ring 9 shrunk thereon, when desired, to better withstand the pressure employed. The holder 8 is provided with an opening 10 formed substantially centrally thereof and provided with oppositely positioned inclined side walls 11 and 12, and oppositely positioned straight walls 13 and 14. A pair of interfitting die members 16 and 17 are provided, each of which has an exterior inclined face 18 adapted to engage one of the inclined walls 11 or 12 of the opening, and a straight face 19 adapted to engage one of the straight walls 13 or 14 when the die members are in operative position within the holder 8. Each die member is provided with an angular groove 20 formed on one face thereof, the grooves 20 being so arranged as to cooperate to form a laterally contractible chamber or passage 21 between the die members when they are in assembled position within the holder. Interconnecting transverse grooves 22 and 23 are formed in each face of the angular groove 20 adjacent to one end of the die member, and the grooves 20 are so positioned relative to each other that the grooves 22 and 23 formed in the opposite die members occupy substantially a common plane when the die members are in assembled position. A plate 24 is adapted to fit within the opposite interconnected grooves 22 and 23 when the die members are in assembled position, and to slide freely within the groove in such a manner as to permit free movement of the die members towards each other to the extent necessary while closing the lower end of the chamber 21 formed by the mating grooves 20 when the die members are located in assembled relation.

The chamber 21 formed by the mating grooves 20 is of substantially uniform cross-section throughout its extent, and is capable of being contracted substantially uniformly throughout its length when the die members 16 and 17 are moved towards each other by being forced downwardly within the opening 10 of the holder so as to materially reduce the cross-sectional area of the chamber 21 and compress a metal shape placed therein.

When a metal shape of the general form shown in Figs. 1 to 3 of the drawing has been heated to the required temperature and the die members 16 and 17 assembled in the holder 8 after the manner substantially as shown in Fig. 4 of the drawing, the heated metal shape is immediately inserted in the chamber 21 so as to rest upon the plate 24, and high pressure is applied to the exposed ends of the die members 16 and 17 to force them downwardly simultaneously within the opening 10, whereby the inclined walls 11 and 12 bearing against the inclined faces 18 of the die members force the die members towards each other and exert lateral pressure upon the metal shape. The straight walls 13 and 14 hold the die members against separation while being forced into the opening 10 and thus limit the lateral expansion of the metal shape in directions at right angles to the direction of the applied force. In the use of this form of mechanism a slight elongation of the compressed metal takes place upwardly from the plate 24 under the pressure exerted laterally upon the metal shape.

In Figs. 8 and 9 of the drawing there is shown a special form of die member 30 having an inclined outer face 31 and a straight outer face 32, and provided with a recess 33 so shaped as to curve one side of the recess as shown at 34. As in the form of die member previously shown grooves 35 and 36 are provided to receive a supporting plate 24. The cooperating die member employed with the die member 30 may be similar in all respects to the die member 17 shown in Fig. 7 of the drawing. The use of the die member 30 serves to impart a curved cutting face 38 to a cutting tool bit 39 formed by the die member 30 in cooperation with a die member 17 of the type shown in Figs. 4 to 7 of the drawing without any machining operation for shaping the cutting edge. Any desired shape may be given to the side 34 of the recess 33 for forming one edge of the cutting tool in any desired manner to adapt it for use in special cutting operations, such as for cutting threads, special grooves or the like.

While the present method and means have been described with particular reference to their adaptability for use in forming metal cutting tools and metal working tools from suitable steels, steel alloys, high speed steels and high speed alloys, they are also adapted for use with metals generally which are suitable for the purpose and adaptable for treatment as above described, whenever it may be desirable to treat metal shapes for the purpose of securing increased hardness and tenacity and to improve the fineness and uniformity of the metal grain.

The high speed alloy known as stellite is commonly sold in the form of castings which are characterized by extreme brittleness as well as by the metal being of a coarse texture and containing many air-like bubbles and imperfections. I have found that in treating stellite by the method above described, either as a separate entity or as a central core within a casing of steel or iron, as shown in Fig. 3, the hardness of the stellite is increased and the grain of the metal is rendered fine and uniform throughout with the elimination of all air-like bubbles and imperfections within the metal. In addition the stellite is rendered very tough so that it may be broken only with considerable difficulty.

I have found also that machine steels, high speed steels and high speed alloys are similarly hardened and toughened by the process as well as their grain being rendered more compact and given a considerably finer texture.

In the case of certain special alloy steels, such as those containing silicon and chromium, commonly known as stainless steels, like results are obtained, the hardness of the metal being increased so as to cut glass fairly readily while the toughness of the steel is increased to such a degree as to render a section of one-fourth inch in diameter bendable under repeated heavy blows but substantially unbreakable by hammering.

In treating metals by the process above described, the high lateral pressure to which the metal shapes are subjected within the die members while the metal is held against material lateral expansion at right angles to the line of pressure not only compacts the metal but tends to effect a slight elongation of the shape in a direction parallel with its major axis, which appears to produce an elongation of the molecules of the metal thereby greatly increasing its toughness or torsional strength, so that metals ordinarily characterized by great brittleness become exceedingly difficult to break, and metals less brittle have their toughness proportionately increased.

It will be understood that in the formation of cutting tool bits, the end of the completed tool shape is ground away to provide cutting angles after a manner well known in the art.

While I have described the method with particular reference to its application to hard metals, such as steels, high speed steels, special steels and high speed alloys such as are adaptable for the purpose, and more especially for use in connection with the formation of metal working, turning and cutting tools, it is to be understood that the method and means for carrying out the method are applicable for use generally in connection with any suitable metals with which it may be found desirable to effect an increase in the properties of hardness and toughness, or an improvement in the granular constitution thereof, both in the formation of cutting tools and for such numerous other purposes as it may be found to be adapted.

While the above described method is capable of use for the purpose of hardening and improving the grain and cutting qualities of metals generally, it is particularly applicable for use in connection with what are known as high speed steels and high speed alloys, of which stainless steel and stellite and similar hard metals and hard metal alloys may be taken as examples. Such metals and alloys are now widely used in the arts, as in metal cutting and turning operations, by reason of their hardness and ability to hold a cutting edge, and this hardness as well as the toughness of the metals is greatly increased when they are subjected to the above described method of treatment. For the sake of brevity such metals may be designated generally as high speed metals or hard metal alloys, and it is to be understood that such terms and expressions when used in the specification and claims are employed to designate that class of hard cutting metals and hard metal alloys of which high speed steels, special alloy steels and high speed alloys are well known examples.

What I claim is:—

1. The method of forming a cutting tool for cutting hard metals which comprises, heating a metal alloy shape containing cobalt and one or more metals of the chromium group to a temperature approaching the melting point of the metal alloy and immediately compressing the metal alloy to compact the metal particles and improve the cutting qualities of the alloy.

2. The method of forming a cutting tool for cutting hard metals which comprises, heating a metal alloy shape containing cobalt and one or more metals of the chromium group to a temperature closely approaching the fusion point of the metal alloy and immediately subjecting the heated metal alloy shape to a pressure sufficient to compact the metal molecules and reduce substantially the bulk of the metal alloy.

3. The method of intimately uniting a hard metal alloy containing cobalt and one or more metals of the chromium group to iron or steel which comprises, inserting a portion of said hard metal alloy within a recess formed in an iron or steel shape, heating said composite shape to a high temperature and immediately subjecting the same to a pressure sufficient to compress the composite shape and form a close union between the metals.

4. A cutting tool bit for cutting hard metals having a portion consisting of an alloy containing cobalt and one or more metals of the chromium group, the molecular structure of which has been modified by compression while at a high temperature to compact the alloy metal and reduce the bulk thereof.

5. A cutting tool bit for cutting hard metals having a steel portion and a portion consisting of an alloy containing cobalt and one or more metals of the chromium group, said alloy metal portion being integrally united directly with the steel portion and the molecular structure thereof modified by the application of high pressure to the composite bit while heated to a high temperature.

6. The method of making a cutting tool for cutting hard metal which comprises, heating a metal alloy comprising cobalt and one or more metals of the chromium group to a temperature closely approaching the melting point of the alloy metal while out of direct contact with a flame, and immediately subjecting the metal alloy while at a temperature closely approaching its melting point to a pressure sufficient to compact the molecules of the alloy metal and effect an elongation of the same in a direction at substantially right angles to the direction of the applied pressure.

7. The method of making a cutting tool for cutting hard metals which comprises, heating a hard metal alloy comprising cobalt and one or more metals of the chromium group to a temperature closely approaching the melting point of the alloy metal, and immediately subjecting said metal while at a temperature closely approaching its melting point to a pressure sufficient when taken in conjunction with the heat previously applied to the metal to render portions of the metal partially plastic and effect a compacting of the metal molecules.

8. The method of forming a cutting tool for cutting hard metals which comprises, heating an iron or steel shape having a portion formed of a hard metal alloy comprising cobalt and one or more metals of the chromium group to a temperature closely approaching the melting point of that part of the composite shape which has the lowest melting point, and then immediately subjecting said composite shape to a pressure sufficient when taken in conjunction with the heat previously applied thereto to at least partially plasticize that part of the composite shape having the lowest melting point and integrally unite the dissimilar metals.

FERNANDO OSCAR JAQUES.